United States Patent
Aigerman et al.

(10) Patent No.: US 11,080,819 B1
(45) Date of Patent: Aug. 3, 2021

(54) GENERATING DEVELOPABLE DEPTH IMAGES USING RANK MINIMIZATION

(71) Applicant: ADOBE INC., San Jose, CA (US)

(72) Inventors: Noam Aigerman, San Francisco, CA (US); Alec Jacobson, Toronto (CA); Silvia Gonzalez Sellan, Toronto (CA)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/923,936

(22) Filed: Jul. 8, 2020

(51) Int. Cl.
*G06T 3/00* (2006.01)
*G06T 7/13* (2017.01)
*G06T 7/50* (2017.01)

(52) U.S. Cl.
CPC .............. *G06T 3/0093* (2013.01); *G06T 7/13* (2017.01); *G06T 7/50* (2017.01); *G06T 2207/10028* (2013.01)

(58) Field of Classification Search
CPC ........... G06T 3/0093; G06T 7/50; G06T 7/13; G06T 2207/10028
See application file for complete search history.

(56) References Cited

U.S. PATENT DOCUMENTS

| | | | |
|---|---|---|---|
| 2008/0175507 A1* | 7/2008 | Lookingbill | G06K 9/228 382/255 |
| 2010/0201682 A1* | 8/2010 | Quan | G06T 15/04 345/419 |
| 2020/0120233 A1* | 4/2020 | Annunziata | G06N 3/08 |

OTHER PUBLICATIONS

Fazel, M., "Matrix rank minimization with applications," PhD dissertation submitted to the Dept. of Electrical Engineering and Committee on Graduate Studies of Stanford University, Mar. 2002 (Year: 2002).*
Sellán, S., Aigerman, N., & Jacobson, A. (Jul. 2020). Developability of heightfields via rank minimization. ACM Transactions on Graphics, 39(4), 10-1145.
Bo, P., & Wang, W. (Sep. 2007). Geodesic-controlled developable surfaces for modeling paper bending. In Computer Graphics Forum (vol. 26, No. 3, pp. 365-374). Oxford, UK: Blackwell Publishing Ltd.
Bradley, D. (2006). Deforming Developable Surfaces. The University of British Columbia. 5 pages.
Candès, E. J., Li, X. Ma, Y., & Wright, J. (2011). Robust principal component analysis?. Journal of the ACM (JACM), 58(3), 1-37.

(Continued)

*Primary Examiner* — Phi Hoang
(74) *Attorney, Agent, or Firm* — Shook, Hardy & Bacon LLP

(57) ABSTRACT

An image processing system receives an input depth image with a surface that is not developable and generates an output depth image with a piecewise developable surface that approximates the input depth image. Height values for the output depth image are determined using an optimization problem that balances data fidelity and developability. Data fidelity is based on minimizing differences in height values of pixels in the output depth image and height values of pixels in the input depth image. Developability is based on rank minimization of Hessians computed for pixels in the output depth image. In some configurations, the optimization problem is formulated as a semi-definite programming problem and solved using a tailor-made alternating direction method of multipliers algorithm.

20 Claims, 8 Drawing Sheets

(56) References Cited

OTHER PUBLICATIONS

Candès, E. J. & Wakin, M. B. (2008). An introduction to compressive sampling. IEEE signal processing magazine, 25(2), 21-30.
Chen, H. Y., Lee, I. K., Leopoldseder, S., Pottmann, H., Randrup, T., & Wallner, J. (1999). On surface approximation using developable surfaces. Graphical Models and Image Processing, 61(2), 110-124.
Bíscaro, H. H., & Lima, J. P. (2015). Compressive representation of three-dimensional models. SBC Journal on Interactive Systems, 6(1), 76-84.
Decaudin, P., Julius, D., Wither, J., Boissieux, L., Sheffer, A., & Cani, M. P. (Sep. 2006). Virtual garments: A fully geometric approach for clothing design. In Computer Graphics Forum (vol. 25, No. 3, pp. 625-634). Oxford, UK and Boston, USA: Blackwell Publishing, Inc.
Didas, S., & Weickert, J. (2004). Higher order variational methods for noise removal in signals and images. Saarbrücken, Saarland Universitesi.
Dudte, L. H., Vouga, E., Tachi, T., & Mahadevan, L. (2016). Programming curvature using origami tessellations. Nature materials, 15(5), 583-588.
Fazel, M., Hindi, H., & Boyd, S. P. (Jun. 2001). A rank minimization heuristic with application to minimum order system approximation. In Proceedings of the 2001 American Control Conference.(Cat. No. 01CH37148) (vol. 6, pp. 4734-4739). IEEE.
Hofer, M., Odehnal, B., Pottmann, H., Steiner, T., & Wallner, J. (Oct. 2005). 3D shape recognition and reconstruction based on line element geometry. In Tenth IEEE International Conference on Computer Vision (ICCV'05) vol. 1 (vol. 2, pp. 1532-1538). IEEE.
Huang, J., Jiang, T., Shi, Z., Tong, Y., Bao, H., & Desbrun, M. (2014). $l$ 1-based construction of polycube maps from complex shapes. ACM Transactions on Graphics (TOG), 33(3), 1-11.
Julius, D., Kraevoy, V., & Sheffer, A. (Sep. 2005). D-charts: Quasi-developable mesh segmentation. In Computer Graphics Forum (vol. 24, No. 3, pp. 581-590). Amsterdam: North Holland, 1982-.
Jung, A., Hahmann, S., Rohmer, D., Begault, A., Boissieux, L., & Cani, M. P. (2015). Sketching folds: Developable surfaces from non-planar silhouettes. Acm Transactions on Graphics (TOG), 34(5), 1-12.
Lee, K. W., & Bo, P. (2016). Feature curve extraction from point clouds via developable strip intersection. Journal of Computational Design and Engineering, 3(2), 102-111.
Leopoldseder, S., & Pottmann, H. (1998). Approximation of developable surfaces with cone spline surfaces. Computer-Aided Design, 30(7), 571-582.
Lipman Y. Cohen-Or, D., Levin, D., & Tal-Ezer, H. (2007). Parameterization-free projection for geometry reconstruction. ACM Transactions on Graphics (TOG), 26(3), 22-es.
Liu, H. T. D. & Jacobson, A. (2019). Cubic stylization. arXiv preprint arXiv:1910.02926.
Liu, Y., Pottmann, H., Wallner, J., Yang, Y. L., & Wang, W. (2006). Geometric modeling with conical meshes and developable surfaces. In ACM SIGGRAPH 2006 Papers (pp. 681-689).
Lu, X., Schaefer, S., Luo, J., Ma, L., & He, Y. (2020). Low rank matrix approximation for 3D geometry filtering. IEEE Transactions on Visualization and Computer Graphics.
Narain, R., Pfaff, T., & O'Brien, J. F. (2013). Folding and crumpling adaptive sheets. ACM Transactions on Graphics (TOG), 32(4), 1-8.
Perriollat, M., & Bartoli, A. (2013). A computational model of bounded developable surfaces with application to image-based three-dimensional reconstruction. Computer Animation and Virtual Worlds, 24(5), 459-476.
Peternell, M. (2004). Developable surface fitting to point clouds. Computer Aided Geometric Design, 21(8), 785-803.
Pottmann, H., Schiftner, A., Bo, P., Schmiedhofer, H., Wang, W., Baldassini, N., & Wallner, J. (2008). Freeform surfaces from single curved panels. ACM Transactions on Graphics (TOG), 27(3), 1-10.
Pottmann, H., & Wallner, J. (1999). Approximation algorithms for developable surfaces. Computer Aided Geometric Design, 16(6), 539-556.
Rabinovich, M., Hoffmann, T., & Sorkine-Hornung, O. (2018). Discrete geodesic nets for modeling developable surfaces. ACM Transactions on Graphics (ToG), 37(2), 1-17.
Rabinovich, M., Hoffmann, T., & Sorkine-Hornung, O. (2018). The shape space of discrete orthogonal geodesic nets. ACM Transactions on Graphics (TOG), 37(6), 1-17.
Rabinovich, M., Hoffmann, T., & Sorkine-Hornung, O. (2019). Modeling curved folding with freeform deformations. ACM Transactions on Graphics (TOG), 38(6), 1-12.
Rose, K., Sheffer, A., Wither, J., Cani, M. P., & Thibert, B. (Jul. 2007). Developable surfaces from arbitrary sketched boundaries. In SGP'07—5th Eurographics Symposium on Geometry Processing (pp. 163-172). Eurographics Association.
Rudin, L. I., Osher, S., & Fatemi, E. (1992). Nonlinear total variation based noise removal algorithms. Physica D: nonlinear phenomena, 60(1-4), 259-268.
Rustamov, R. M. (Aug. 2011). Multiscale biharmonic kernels. In Computer Graphics Forum (vol. 30, No. 5, pp. 1521-1531). Oxford, UK: Blackwell Publishing Ltd.
Schreck, C., Rohmer, D., Hahmann, S., Cani, M. P., Jin, S., Wang, C. C., & Bloch, J. F. (2015). Nonsmooth developable geometry for interactively animating paper crumpling. ACM Transactions on Graphics (TOG), 35(1), 1-18.
Solomon, J., Vouga, E., Wardetzky, M., & Grinspun, E. (Aug. 2012). Flexible developable surfaces. In Computer Graphics Forum (vol. 31, No. 5, pp. 1567-1576). Oxford, UK: Blackwell Publishing Ltd.
Stein, O., Grinspun, E., & Crane, K. (2018). Developability of triangle meshes. ACM Transactions on Graphics (TOG), 37(4), 1-14.
Stein, O., Grinspun, E., Wardetzky, M., & Jacobson, A. (2018). Natural boundary conditions for smoothing in geometry processing. ACM Transactions on Graphics (TOG), 37(2), 1-13.
Subag, J., & Elber, G. (Jul. 2006). Piecewise developable surface approximation of general NURBS surfaces, with global error bounds. In International Conference on Geometric Modeling and Processing (pp. 143-156). Springer, Berlin, Heidelberg.
Tang, C., Bo, P., Wallner, J., & Pottmann, H. (2016). Interactive design of developable surfaces. ACM Transactions on Graphics (TOG), 35(2), 1-12.
Wang, H., Pellis, D., Rist, F., Pottmann, H., & Müller, C. (2019). Discrete geodesic parallel coordinates. ACM Transactions on Graphics (TOG), 38(6), 1-13.
Wei, M., Huang, J., Xie, X., Liu, L., Wang, J., & Qin, J. (2018). Mesh denoising guided by patch normal co-filtering via kernel low-rank recovery. IEEE transactions on visualization and computer graphics, 25(10), 2910-2926.
Zhang J., Cao, J., Liu, X., Wang, J., Liu, J., & Shi, X. (2013). Point cloud normal estimation via low-rank subspace clustering. Computers & Graphics, 37(6), 697-706.
Zhang J., Deng, B., Liu, Z., Patanè, G., Bouaziz, S., Hormann, K., & Liu, L. (2014). Local barycentric coordinates. ACM Transactions on Graphics (TOG), 33(6), 1-12.
Zhang J., Deng, B., Hong, Y., Peng, Y., Qin, W., & Liu, L. (2018). Static/dynamic filtering for mesh geometry. IEEE transactions on visualization and computer graphics, 25(4), 1774-1787.

* cited by examiner

GENERATING DEVELOPABLE DEPTH IMAGES USING RANK MINIMIZATION

BACKGROUND

A depth image is any two-dimensional image that has a height value for each pixel. Depth images commonly rise when an object is "scanned"—for instance, as the output of a 3D scanner, or depth inferred for each RGB pixel (e.g., using a neural network). In many cases, the scanned objects are "developable," meaning the objects have geometrics surfaces that can be created from a planar surface by folding, creasing, bending, or welding without stretching or tearing, such as a bent piece of paper. Particular developable objects that are commonly scanned are printed documents, books, and receipts. However, in many cases the depth estimation is crude with artifacts and the resulting geometry is not developable, affecting appearance as well as the ability to, for instance, "unwarp" a document that is folded.

SUMMARY

Embodiments of the present invention relate to, among other things, an image processing system that receives an input depth image with a surface that is not developable and generates an output depth image with a piecewise developable surface that approximates the input depth image. Height values for the output depth image are determined using an optimization problem that balances data fidelity and developability. Data fidelity is based on minimizing differences in height values of pixels in the output depth image and height values of pixels in the input depth image. Developability is based on rank minimization of Hessians computed for pixels in the output depth image. In some configurations, the optimization problem is formulated as a semi-definite programming problem and solved using a tailor-made alternating direction method of multipliers algorithm.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
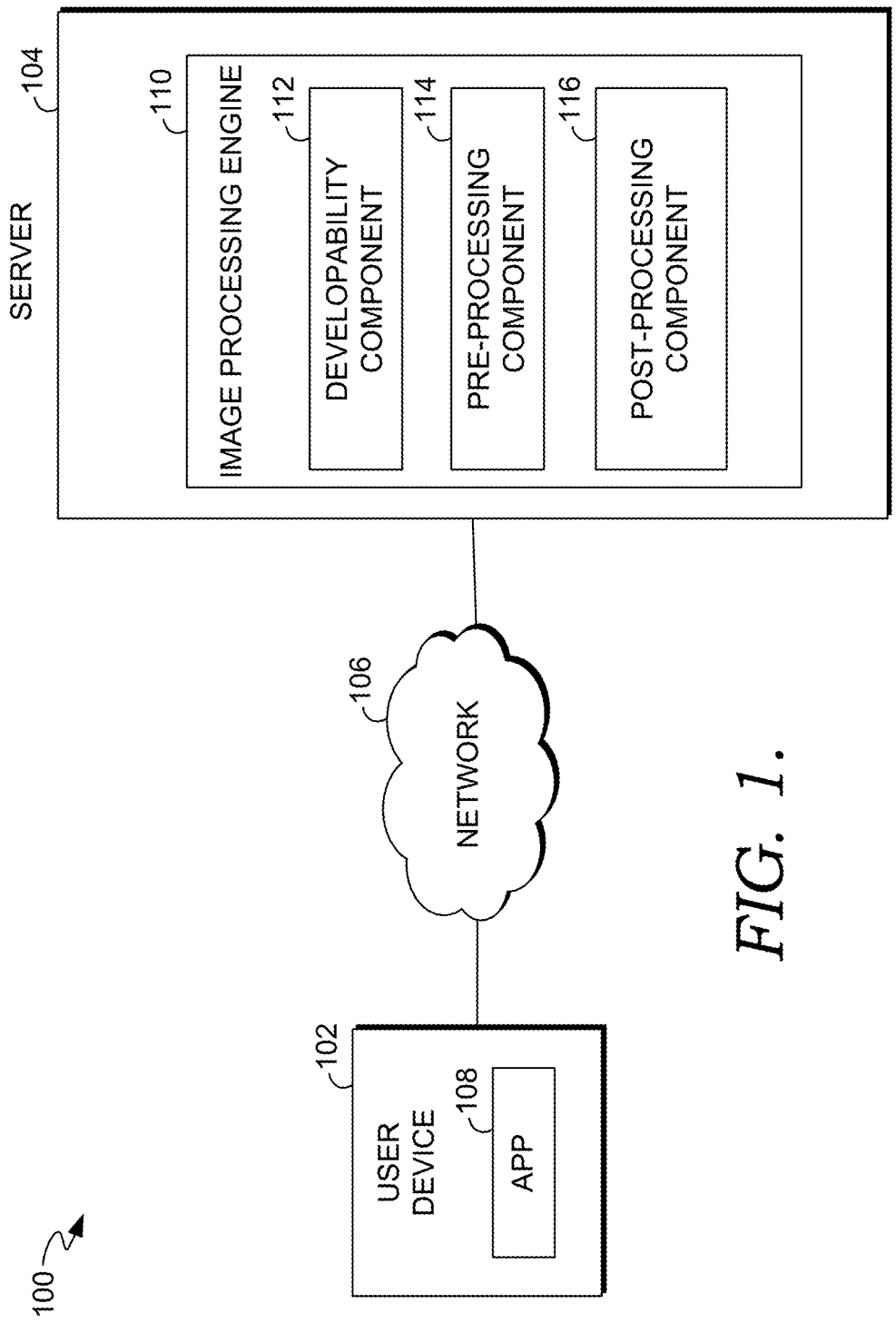
FIG. 1 is a block diagram illustrating an exemplary system in accordance with some implementations of the present disclosure.

Developability determines an important subclass of surfaces in three-dimensions. Developable surfaces are locally isometric to the two-dimensional plane. A (piecewise) developable surface is one that can be constructed by folding, creasing, bending or welding planar surfaces without stretching. These surfaces are heavily studied in differential geometry, and are also of great interest to fabrication, architecture, and fashion. Piecewise developable surfaces are found in a variety of objects: paper pages of a book, mechanical objects manufactured with a 5-axis CNC-mill, the wooden-plank hulls of boats, and the steel and glass panels of modern architecture, to name a few.

While manufacturing techniques for developable surfaces enjoy a long history and ubiquitous use, computational methods for developable surfaces have been notoriously elusive. Mapping the curvature criteria of developability to common discrete surface representations can be tricky: for example, a triangle mesh is trivially piecewise developable; meanwhile, a quad mesh is in general non-planar. There has been a recent surge of advances building new discrete notions of developability for these and other common surface representations. Many if not most works focus on defining developability for a single smooth patch without crease or weld curves, while others require a small number of explicitly provided curves. These methods focus on forward simulation of bending planar patches into a design or surfacing provided boundary curves. Relatively few works consider the inverse problem: which piecewise developable surface best explains an input observation. Methods that do exist suffer from discretization dependence, poor robustness (e.g., getting stuck in local minima), sensitive parameters, or poor scalability.

Embodiments of the present invention are directed to an image processing system that addresses these challenges by providing a solution that generates piecewise developable depth images from input depth images. At a high level, the image processing system takes an input depth image with a surface that is not developable and generates an output depth image describing a piecewise developable surface that approximates the input depth image. As used herein, a "depth image" (also referred to herein as a "heightfield") refers to any two-dimensional arrangement of pixels in which each pixel, in addition to having x- and y-coordinates in the two-dimensional arrangement, has a z-value (also referred to herein as a "height value").

In accordance with the technology described herein, a piecewise developable output depth image that approximates an input depth image is generated by determining height values for pixels of the output depth image from solving an optimization problem that balances data fidelity (extent of the output depth image's adherence to the input depth image) and developability. A parameter, which may be user specified, can be used in the optimization problem to balance data fidelity with developability.

For data fidelity, the optimization problem minimizes the difference between height values for pixels in the output depth image and height values for corresponding pixels in the input depth image. For developability, the optimization problem minimizes the rank of Hessians computed for pixels of the output depth image. In this way, the Hessian for a pixel is used as a discrete measurement of developability providing an indication of how much the surface is locally bending in two directions. When the Hessian for a pixel is low rank, the pixel can be considered to be developable in the discrete sense.

In some instances, the optimization problem reduces the nuclear norm of Hessians for pixels in the output depth image. The nuclear norm is a good proxy to the rank, and hence this results in minimizing the rank of the Hessians. In further instances, the optimization problem is reduced to a semi-definite programming problem. In still further instances, the optimization problem is efficiently solved using a tailor-made alternating direction method of multipliers (ADMM) algorithm.

The technology described herein has several unique advantages. It is able to handle inputs with noise and arbitrarily high curvature. A convex formulation provided herein yields a unique global minimum. This harmonizes with another quality: a single parameter can be used to balance total developability and data fidelity. Geometrically, the technology described herein poses no restriction on the area of the output surface and the number and orientation of developable patches and creases which may emerge via optimization. The optimization is not affected by the orientation of the underlying mesh connectivity or the mesh's resolution. Further, in contrast to previous techniques, the discretization does not introduce a bias and the same results are achieved across resolutions and orientations, and with no limit on the number of creases and patches. The technology can be used in a variety of applications, from denoising 3D scans of developable geometry such as documents and buildings, through approximating general heightfields with developable ones, and up to interpolating sparse annotations with a developable heightfield.

Example Image Processing System for Developable Depth Images

With reference now to the drawings, FIG. 1 is a block diagram illustrating an exemplary system for generating piecewise developable depth images from input depth images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with an image processing engine 110 hosted by a server 104. Each of the user device 102 and server 104 shown in FIG. 1 can comprise one or more computer devices, such as the computing device 800 of FIG. 8, discussed below. As shown in FIG. 1, the user device 102 and the server 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the server 104 could be provided by multiple server devices collectively providing the functionality of the image processing engine 110 as described herein. Additionally, other components not shown may also be included within the network environment.

The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the image processing engine 110 on the server 104. The application 108 can be, for instance, a web browser or a dedicated application for providing image processing functions, such as those described herein.

At a high level, the image processing engine 110 includes components to process an input depth image and generate a piecewise developable output depth image that approximates the input depth image. As shown in FIG. 1, the components of the image processing engine 110 include a developability component 112, a pre-processing component 114, and a post-processing component 116. These components may be in addition to other components that provide further image processing features beyond the developability features described herein.

The image processing engine 110 can be implemented using one or more server devices (such as the server 104), one or more platforms with corresponding application programming interfaces, cloud infrastructure, and the like. While the image processing engine 110 is shown on a server 104 separate from the user device 102 in the configuration of FIG. 1, it should be understood that in other configurations, some or all of the functions of the image processing engine 110 can be provided on the user device 102. In some configurations, the server 104 is not necessary as all image processing functions are provided locally on the user device 102.

The developability component 112 generally receives an input depth image with a surface that is not developable and generates an output depth image describing a piecewise developable surface that approximates the input depth image. As will be described in further detail below, the developability component 112 processes the input depth image using an algorithm that solves an optimization problem as a function of data fidelity and developability. Data fidelity is based on the difference of height values at each corresponding pixel between the input depth image and the resulting depth image. Developability is based on rank minimization for Hessians computed for pixels in the resulting depth image.

Regarding developability, some aspects of the technology disclosed herein employ a convex objective function that measures how developable an input heightfield surface is. A surface is (piecewise) developable if its Gaussian curvature K is zero (almost) everywhere:

$$K=\kappa_1\kappa_2=0 \Leftrightarrow \kappa_1=0 \text{ or } \kappa_2=0, \quad (1)$$

where K, $\kappa_1$, $\kappa_2$ are the Gaussian, maximum, and minimum curvature, respectively. This condition implies not just that locally the surface is ruled (defined by sweeping a straight line), but further that the surface normals along any ruling line are constant.

Without mentioning principal curvatures explicitly, Equation (1) can be rewritten in terms of the determinant of the surface's second fundamental form $\mathbb{II} \in \mathbb{R}^{2\times 2}$:

$$K = \det \mathbb{II} = 0, \qquad (2)$$

where it is noted that if $\mathbb{II}$ is transformed into the coordinate system of the principal curvature directions then it becomes a diagonal matrix made of $\kappa_1$ and $\kappa_2$, and the determinant is $\kappa_1 \kappa_2$.

Requiring that $\det \mathbb{II} = 0$ is equivalent to requiring that the rank of the second fundamental form is less than one:

$$\text{rank}(\mathbb{II}) \leq 1. \qquad (3)$$

For a non-developable surface, it can generally be expected that rank $\mathbb{II} = 2$. Moving the surface to decrease the rank of the second fundamental form will increase developability.

Integrating the rank of the second fundamental form would lead to an unwieldy objective function. Accordingly, some aspects of the technology described herein invoke the theory of rank minimization and approximate rank integration with the sum of the nuclear norm of the second fundamental form to define a developability objective for a smooth surface S:

$$\int_S \|\mathbb{II}\|_* dA. \qquad (4)$$

While this energy is convex in $\mathbb{II}$, $\mathbb{II}$ is still non-linear in the surface positions, leading to a non-convex energy. One aspect of the technology described herein is the insight that a linear proxy can be used for $\mathbb{II}$ when the surface is a heightfield. In turn, Equation (4) becomes convex in the height values.

Consider now that the surface S can be described as a graph above the plane: $z(x,y): \mathbb{R}^2 \to \mathbb{R}$, transforming the area element dA into dxdy. The Hessian $H: \mathbb{R}^2 \to \mathbb{R}^{2\times 2}$ of this height function is the symmetric matrix of second partial derivatives:

$$H(x, y) := \begin{pmatrix} \frac{\partial^2 z}{\partial x^2} & \frac{\partial^2 z}{\partial x \partial y} \\ \frac{\partial^2 z}{\partial x \partial y} & \frac{\partial^2 z}{\partial y^2} \end{pmatrix}. \qquad (5)$$

The Hessian H of a heightfield $z$ is proportional in some basis to the second fundamental form $\mathbb{II}$ of the surface defined as the graph of $z$. In particular, this means that: H has low rank if and only if $\mathbb{II}$ has low rank.

Thus, we can safely substitute H for $\mathbb{II}$ in Equation (4), resulting in the following developability objective for heightfields:

$$\iint \|H(x,y)\|_* dxdy. \qquad (6)$$

The Hessian is a linear operator in the height function $z$, and hence, combined with the convex nuclear norm, this objective is convex in the height $z$. The scalar factor that relates H and $\mathbb{II}$ depends on the surface's geometry and is what makes Equation (4) non-convex.

To address the discrete nature of image pixels, the Hessian nuclear-norm energy in Equation (6) can be discretized. While a square lattice of pixels from a depth image can be employed, some aspects of the technology described herein discretize over a regular hexagonal lattice with edge length h placed over the planar domain. For each vertex i (corresponding with a pixel), its two-dimensional position $x_i = [x_i, y_i] \in \mathbb{R}^2$ is associated with its height value $\mathbb{R}_i \in \mathcal{Z}$. Treating z as a smooth function, its Taylor expansion exposes its Hessian matrix:

$$z(x + \Delta x) = z(x) + \nabla z^T (\Delta x) + \frac{1}{2}(\Delta x)^T H(\Delta x) + \ldots \qquad (7)$$

This suggests a best quadratic fit approximation of the Hessian (and gradient and constant).

Figure 2:
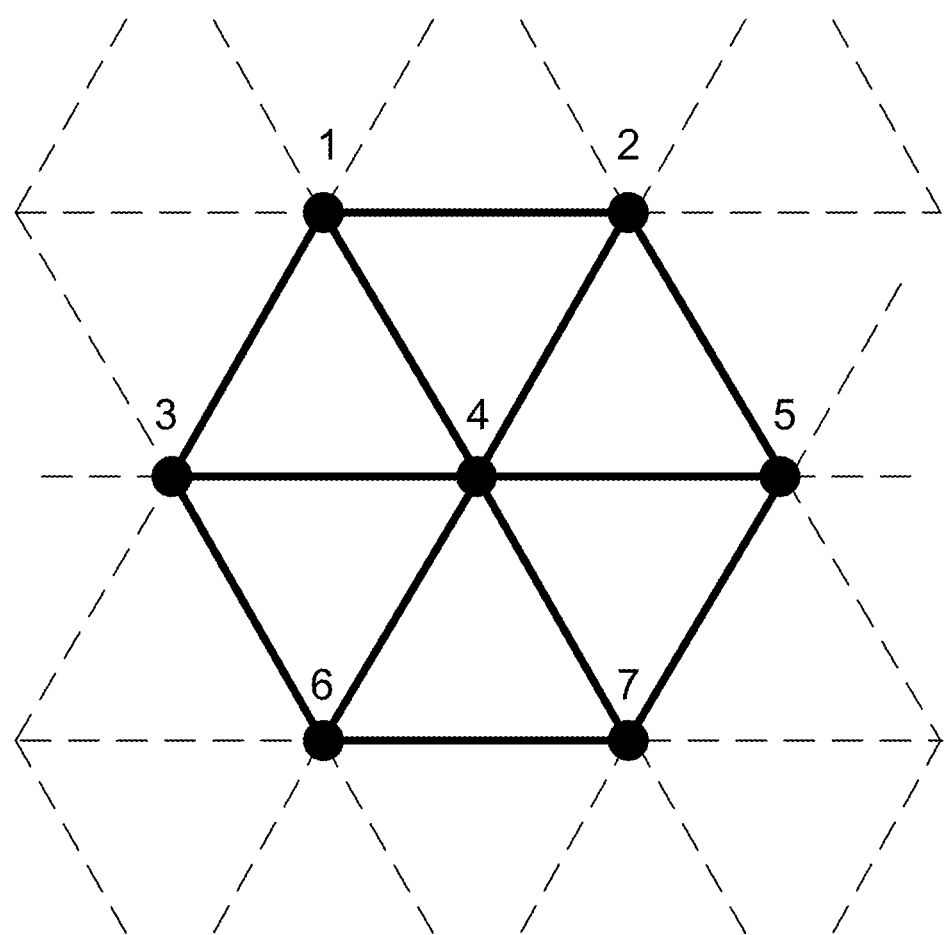
FIG. 2 is a diagram showing a lattice of a hexagonal pixel grid used for determining a Hessian for a pixel in accordance with some implementations of the present disclosure.

The chosen hexagonal lattice supplies six neighbors that are equal distance and equally distributed radially to facilitate this approximation. Compared, for example, to a regular square lattice, this leads to a less biased approximation. By way of example, FIG. 2 illustrates a hexagonal lattice for a pixel at vertex position $x_4$ surrounded by its six neighbors at vertex positions, $x_1, x_2, x_3, x_5, x_6, x_7$. Looking locally at the vertex at position $x_4$ surrounded by its six neighbors, (w.l.o.g., indexed reading order), we can solve for the coefficients $c = [h_{xx}, h_{yy}, h_{xy}, g_x, g_y, c]$ of the best fit quadratic function:

$$\min_{\substack{c \in \mathbb{R} \\ g \in \mathbb{R}^2 \\ H = H^T \in \mathbb{R}^{2\times 2}}} \frac{1}{2} \sum_{i=1}^{7} \left\| c_4 + g^T(x_i - x_4) + \frac{1}{2}(x_i - x_4)^T H(x_i - x_4) - z_i \right\|.$$

This can be written as a linear function of the vertex heights c=Bz for a specific matrix B. Applying the first three rows of this matrix locally at each vertex i reveals the entries of the best fit Hessian $h_{xx}^i, h_{yy}^i, h_{xy}^i$ as a linear function of the local height values.

Figure 3:
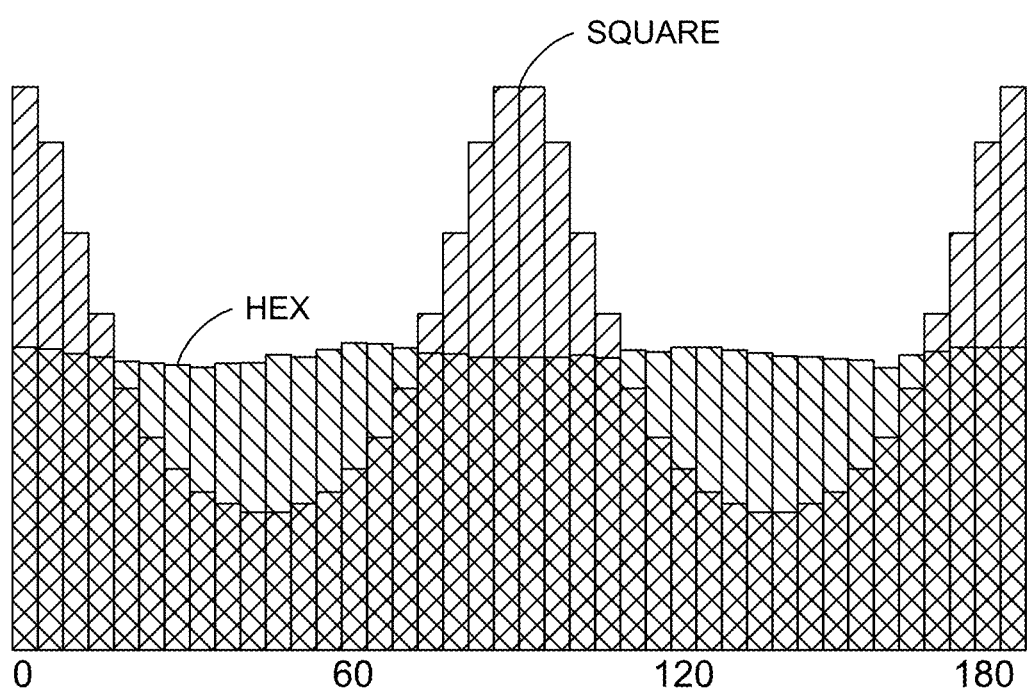
FIG. 3 is a graph showing results of an experiment where randomly generated samples on both square and hexagonal grids were used to obtain angles of the principal directions of the least-squares Hessian.

The advantage of using a hexagonal lattice as opposed to a square one can now be demonstrated. Experimentally, it can be observed that using a sampling on a square leads to approximated Hessians that are biased towards alignment with the grid edges (multiples of ninety degrees). This is in contraposition to the hexagonal lattice, where bias towards the grid directions is barely distinguishable. For instance, FIG. 3 shows the results of an experiment where randomly generated samples on both square and hexagonal minimal grids were used to obtain the angles of the principal directions of the least-squares Hessian. The preference for the hexagonal case is thus justified.

Let $$H^i = \begin{pmatrix} h_{xx}^i & h_{xy}^i \\ h_{yx}^i & h_{yy}^i \end{pmatrix} \in \mathbb{R}^{2\times 2} \qquad (8)$$

be the Hessian approximation corresponding to vertex i. For a (possibly non-convex) planar domain with boundary, the discretized Equation (6) is now summarized as sum over interior vertices I (i.e., set of vertices with a full set of neighbors inside the domain):

$$\sum_{i \in I} \|H\|_*. \qquad (9)$$

The boundary vertices ∂I of the domain are then the set of non-interior vertices touched by any B stencil. In the absence of other constraints, minimizing this energy will lead to these vertices receiving discrete natural boundary conditions.

This energy (and its smooth counterpart) has exactly affine functions in its null spaces. While this means it is non-zero for non-affine developable surfaces, it should not dissuade from its use as a developability measure. This should be analogously comfortable to those familiar with the use of the total variation energy as a smoothness regularizer despite only having constant functions in its null space. In the presence of a data-fitting term or non-trivial boundary conditions, the minimizer will be far from the null space and the gradient behavior of the energy will be the dominating effect.

This discretized Hessian's nuclear norm can be used in the main problem being solved: fitting a piecewise developable surface to an input heightfield observation. The observed heightfield data $\tilde{z} \in \mathbb{R}^n$ arrives as values on a hexagonal lattice with n vertices as discussed hereinabove, or otherwise can be resampled accordingly.

Figure 4:
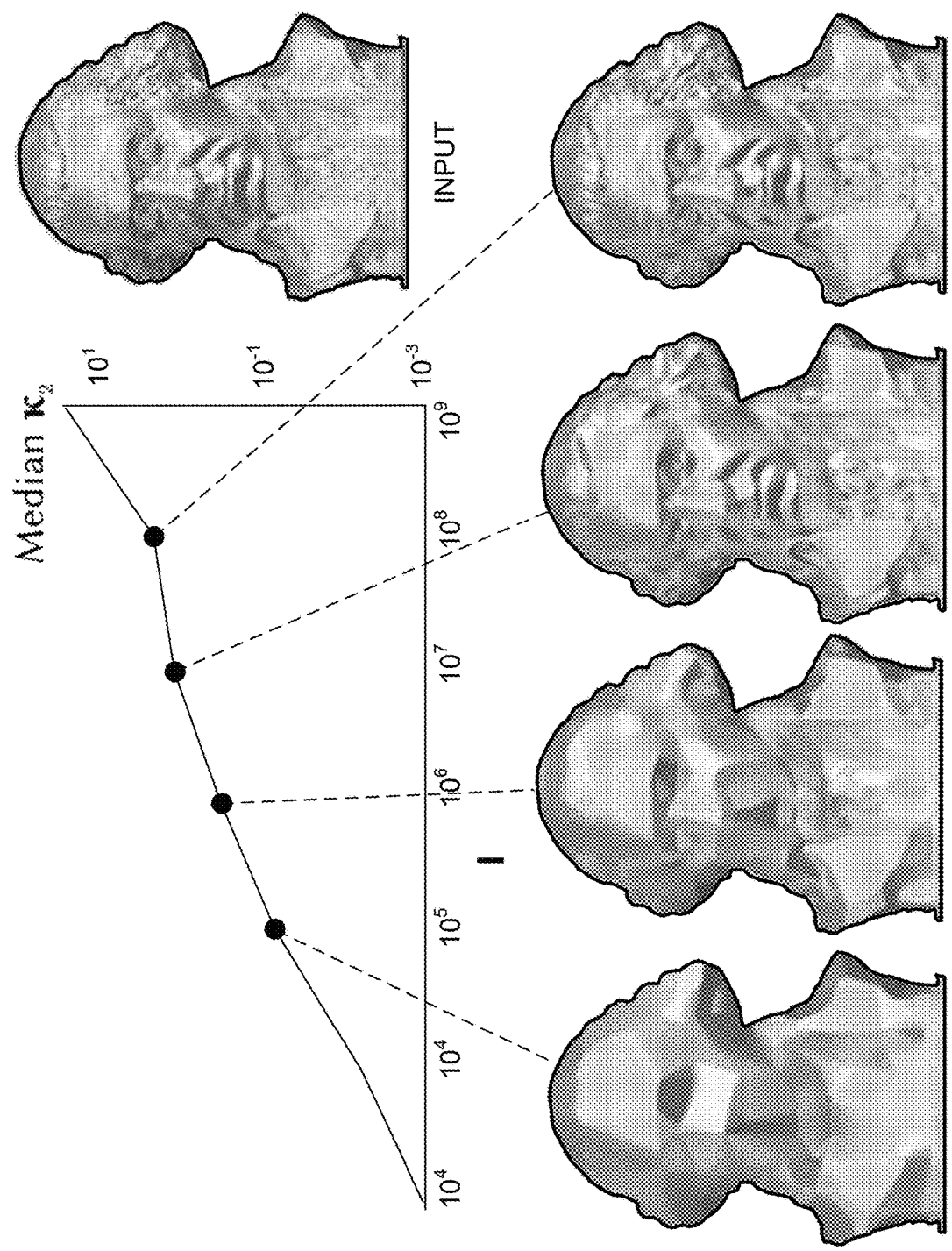
FIG. 4 is a diagram showing how a parameter impacts the data fidelity and developability of an image.

The fitting energy consists of an $L_2$ data fidelity term and the discrete Hessian nuclear norm energy from Equation (9), leading to the following optimization problem:

$$\min_{z,h} \lambda \sum_{i \in I \cup \partial I} \|z_i - \tilde{z}_i\|^2 + \sum_{i \in I} \|H\|_* \quad (10)$$

subject to $Cz = h$ and $h_{xy}^i = h_{yx}^i \forall i \in I$ (11)

where $h \in \mathbb{R}^{4|I|}$ stacks all of the Hessian coefficients of interior vertices and the sparse matrix $C \in \mathbb{R}^{4|I| \times n}$ linearly assembles them according to the local stencil B above. The scalar weighting parameter $\lambda$, which may be user selected, balances data fidelity and developability. For instance, FIG. 4 illustrates how the $\lambda$ parameter impacts the output data fidelity and developability of a George Washington bust model.

While the objective is convex in the unknown height values $z \in \mathbb{R}^n$, it is more complicated than a simple quadratic program. Indeed, nuclear norm minimizations like this can be reduced to a semi-definite programming problem (SDP) in some configurations. Introducing the auxiliary symmetric matrix variables $X_i = X_i^T, Y_i^T \in \mathbb{R}^{2 \times 2}$ for each interior vertex and rewrite the problem as a semi-definite program:

$$\min_{z,X,Y} \lambda \sum_{i \in I \cup \partial I} \|z_i - \tilde{z}_i\|^2 + \sum_{i \in I} trX_i + trY_i, \quad (12)$$

subject to $Cz = h$, and $h_{xy}^i = h_{yx}^i \forall i \in I$ and $\begin{bmatrix} X_i & h_{xx}^i h_{xy}^i \\ & h_{xy}^i h_{yy}^i \\ h_{xx}^i h_{xy}^i & \\ h_{xy}^i h_{yy}^i & Y_i \end{bmatrix} \succeq 0 \forall i \in I,$ (13)

where $M \succeq 0$ indicates that the matrix M is positive semi-definite

While this SDP can be solved with standard convex optimization techniques in some embodiments, in other embodiments, a direct alternating direction method of multipliers (ADMM) optimization is employed.

ADMM is generally applicable for linearly constrained convex programs written as the sum of two convex objectives, and the problem in Equation (10) already has this form and is in fact already split so that the first and second terms depend only on the z and h variables, respectively.

Using the notation $C^i \in \mathbb{R}^{4 \times n}$ to be the four rows of C corresponding to vertex i, a set of dual variables are introduced: u corresponding to h (with analogous notation $U^i \in \mathbb{R}^{2 \times 2}$ as in Equation (8)). The scaled form of the ADMM algorithm is repeated three steps:

$$z \leftarrow \operatorname{argmin}_z \lambda \|z - \tilde{z}\|^2 + \frac{\rho}{2} \|Cz - h + u\|^2, \quad (14)$$

$$H^i \leftarrow \operatorname{argmin}_{H^i} \|H_i\|_* + \frac{\rho}{2} \|2 \times 2(C^i z) - H^i + U^i\|_F^2, \forall i \in I, \quad (15)$$

$$u \leftarrow u + Cz - h, \quad (16)$$

where $$2 \times 2(a) := \begin{pmatrix} a_{xx} & a_{xy} \\ a_{yx} & a_{yy} \end{pmatrix}. \quad (17)$$

It can been seen from the above that the z update step in Equation (14) is a simple quadratic minimization solved via an n×n sparse linear system. The h update step in Equation (15) is embarrassingly parallel across the vertices of the mesh, depending only on local data. Each local problem is a small semi-definite program in four variables ($h_{xx}^i$, $h_{yy}^i$, $h_{xy}^i$, $h_{yx}^i$).

Rather than call a general-purpose algorithm, each can be solved in closed form and avoid auxiliary variables and other overheads. Equation (15) may include solving (many) small semi-definite programs of the form:

$$H^* = \operatorname{argmin}_{H \in \mathbb{R}^{2 \times 2}} \|H\|_* + \frac{\rho}{2} \|H - G\|_F^2, \quad (18)$$

where the matrix $G \in \mathbb{R}^{2 \times 2}$ (gathering the relevant terms involving C, z, u in Equation (15)) is constant with respect to the unknowns in H.

Let $G = U\Sigma V^T$ be the Singular Value Decomposition of G, with $\Sigma = \operatorname{diag}(\sigma_1, \sigma_2) \in \mathbb{R}^{2 \times 2}$. Let A be an optimum of the above program. Consider the equivalent (i.e., has the same set of optimal solutions) problem $$H^* = \operatorname{argmin}_{H \in \mathbb{R}^{2 \times 2}, \|H\|_* = \|A\|_*} \frac{\rho}{2} \|H - G\|_F^2, \quad (19)$$

Letting the space $\{H \in \mathbb{R}^{2 \times 2}, \|H\|_* = \|H^*\|_*\}$ replace the space denoted there as $\mathcal{T}_k$ (the proof applies to any space of matrices defined in terms of singular values) provides that A's singular vectors are the same as G's, $$A = UDV^T, \quad (20)$$

for some unknown diagonal matrix D.

Plugging $UDV^T$ instead of H in the above minimization, and using both norms' invariance to multiplication by orthogonal matrices provides the optimal D is the diagonal matrix minimizing $$D^* = \underset{D}{\mathrm{argmin}} \|D\|_* + \frac{\rho}{2} \|D - \Sigma\|_F^2. \qquad (21)$$

Writing D=diag(d$_1$, d$_2$), consider each entry independently:

$$d_i^* = \underset{d_i}{\mathrm{argmin}} |d_i| + \frac{\rho}{2} |d_i - \sigma_i|, \qquad (22)$$

whose minimum is simply:

$$d_i^* = \max\left(\sigma_i - \frac{1}{\rho}, 0\right). \qquad (23)$$

To summarize, the optimal H* is found by computing the singular value decomposition of G, computing the diagonal entries of D* according to Equation (23), and then constructing H*=UD*V$^T$. In this optimization, G will always be symmetric by construction, so U=V and the resulting H* will be symmetric by construction, fulfilling the constraint that h$_{xy}$=h$_{yx}$.

After each iteration through the three steps in Equations (14-16), a check for convergence is made and ρ is updated by being increased or decreased to avoid a divergence between the energy minimization and the satisfaction of the linear equality constraint. Updating ρ changes the system matrix in the update of z in Equation (14) which invokes a new sparse Cholesky factorization. To avoid doing this too often, some embodiments may loosen the criteria on triggering a ρ-update.

Having described the developability component 112, the pre-processing component 114 and post-processing component 116 will not be described. The pre-processing component 114 can perform any number of operations on an input depth image prior to processing of the image by the developability component 112. For instance, as discussed above, some configurations operate on pixels arranged in a hexagonal grid. In such configurations, when an input depth image is initially configured with a square pixel grid, the pre-processing component 114 can convert the input depth image from the square pixel grid to a hexagonal pixel grid using known techniques for such conversions.

The pre-processing component 114 can also identify boundary pixels where there are very large jumps in the value of the observations 2 at boundaries. A boundary may occur, for instance, between an object in the foreground of a depth image and the background of the depth image. A boundary may also occur at a self-occlusion on an object, referred to herein as an occlusion boundary.

In some instances, these boundaries are known a priori and are accepted as input. In other instances, the boundaries are detected automatically, for instance by detecting a change in height values between neighboring pixels that exceeds a pre-determined threshold.

Figure 5:
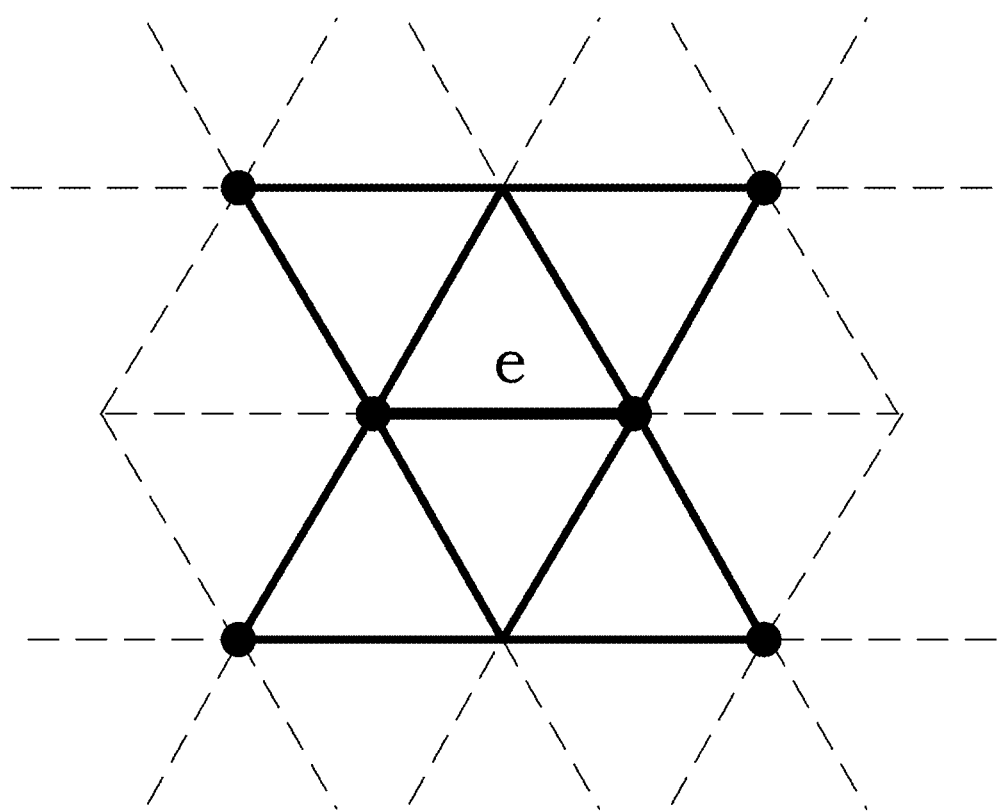
FIG. 5 is a diagram showing vertices in the vicinity of an edge.

In some configurations, a quadratic function is fit to the six vertex heights that are in the vicinity of each edge, such as that shown in FIG. 5. If the largest eigenvalue of the quadratic function's Hessian is greater than a threshold (e.g., a threshold of 4×10$^4$), then the edge is identified as an occlusion boundary. As grid (i.e., "scanning") resolution increases, the curvature of the quadratic fit across these edges grows asymptotically, guaranteeing that for a fine-enough grid, all occlusions, and only them, will be detected.

It should be understood that other methods for detecting occlusion boundaries may be employed with the scope of the technology described herein.

Once provided or detected, the pixels of each boundary are removed from the set of interior vertices (I) where the Hessian stencil will be evaluated. Prior to optimization, the pre-processing component 114 removes any pixels that may end up not touched by any stencil (i.e., not in I or ∂I).

The post-processing component 116 can perform any number of operations on an output depth image after processing by the developability component 112. In some configurations, this includes adjusting the height value of boundary pixels removed from consideration by the pre-processing component 114. The height values of boundary pixels may be determined, for instance, by extrapolating from a best-fit quadratic function to the solution, centered around the nearest interior pixel.

Figure 6:
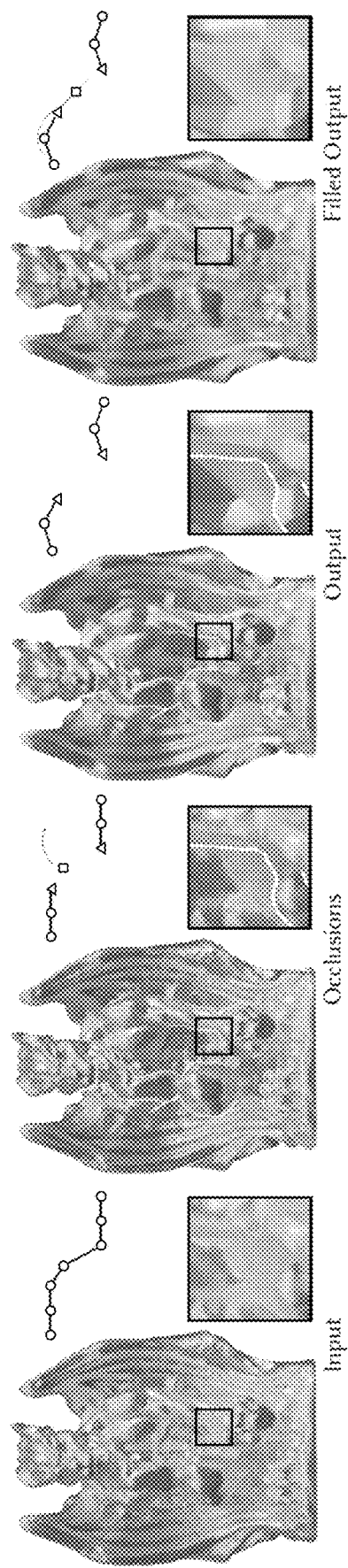
FIG. 6 is a diagram illustrating pre-processing and post-processing for handling occlusions.

FIG. 6 provides an example illustrating pre-processing and post-processing for handling occlusions, illustrated in 1D on top, and with a real input on the bottom. The input 602 is tessellated so that each vertex is connected to all its neighbors. During occlusion detection 604, vertices that lie across a steep change in height are set as boundary and their Hessians are ignored. The two triangle vertices contribute to their circle neighbors' Hessian, but the square vertex has no non-boundary vertices adjacent and hence removed. After processing this modified input to provide an initial output 606, the omitted square vertex is restored 608, with its height value set by extrapolating the quadric approximation of the closest non-boundary vertex.

Example Method for Generating Developable Depth Images

Figure 7:
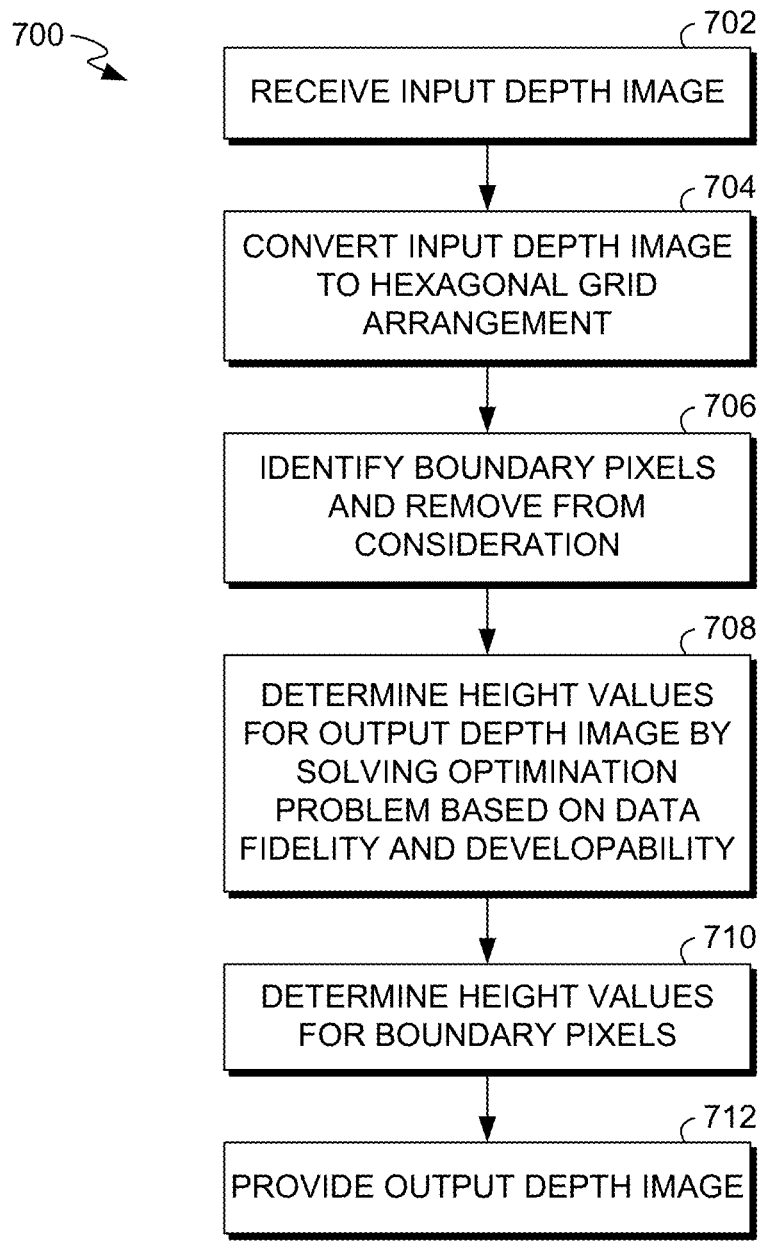
FIG. 7 is a flow diagram showing a method for generating a piecewise developable depth image from an input depth image in accordance with some implementations of the present disclosure.

With reference now to FIG. 7, a flow diagram is provided that illustrates a method 700 for generating an output depth image having a piecewise developable surface from an input depth image. The method 700 may be performed, for instance, by image processing engine 110 of FIG. 1. Each block of the method 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, an input depth image is received. The depth image includes a height value for each pixel. The input depth image is converted from a square grid pixel arrangement to a hexagonal grid pixel arrangement, as shown at block 704. As discussed above, this pre-processing step may not be employed in instances in which the input depth image already has a hexagonal pixel arrangement or if the process operates on depth images with a square grid pixel arrangement. As shown at block 706, boundary pixels are identified and removed from consideration. These boundary pixels may include pixels on the edge of an object in the foreground and a background. The boundary pixels may also include pixels on a boundary occlusion within the object.

The input depth image is processed at block 708 to determine height values for an output depth image by solving an optimization problem based on data fidelity and developability. The optimization problem minimizes differences between height values of the input depth image and the output depth image to provide data fidelity. Additionally, the optimization problem performs rank minimization for Hessians of pixels in the output depth image to provide developability. Hessians for boundary pixels may not be computed or ignored, although the boundary pixels may participate in computing Hessians of neighboring interior pixels.

In some configurations, the optimization problem minimizes the rank of the Hessians computed for pixels of the output depth image by reducing a nuclear norm of the Hessians. The optimization problem may also be formulated as a semi-definite programming problem. In some configurations, the optimization problem is solved using an algorithm generated using ADMM. In such configurations, the process at block 708 may include iteratively: solving Equation (17) using standard quadratic optimization techniques; solving Equation (18) with the novel introduced closed-form solution described hereinabove; and updating variable u according to Equation (19). This process may be repeated until convergence.

At block 710, height values are determined for any boundary pixels identified at block 706. The output depth image is provided, for instance, for presentation, at block 712.

Exemplary Operating Environment

Figure 8:
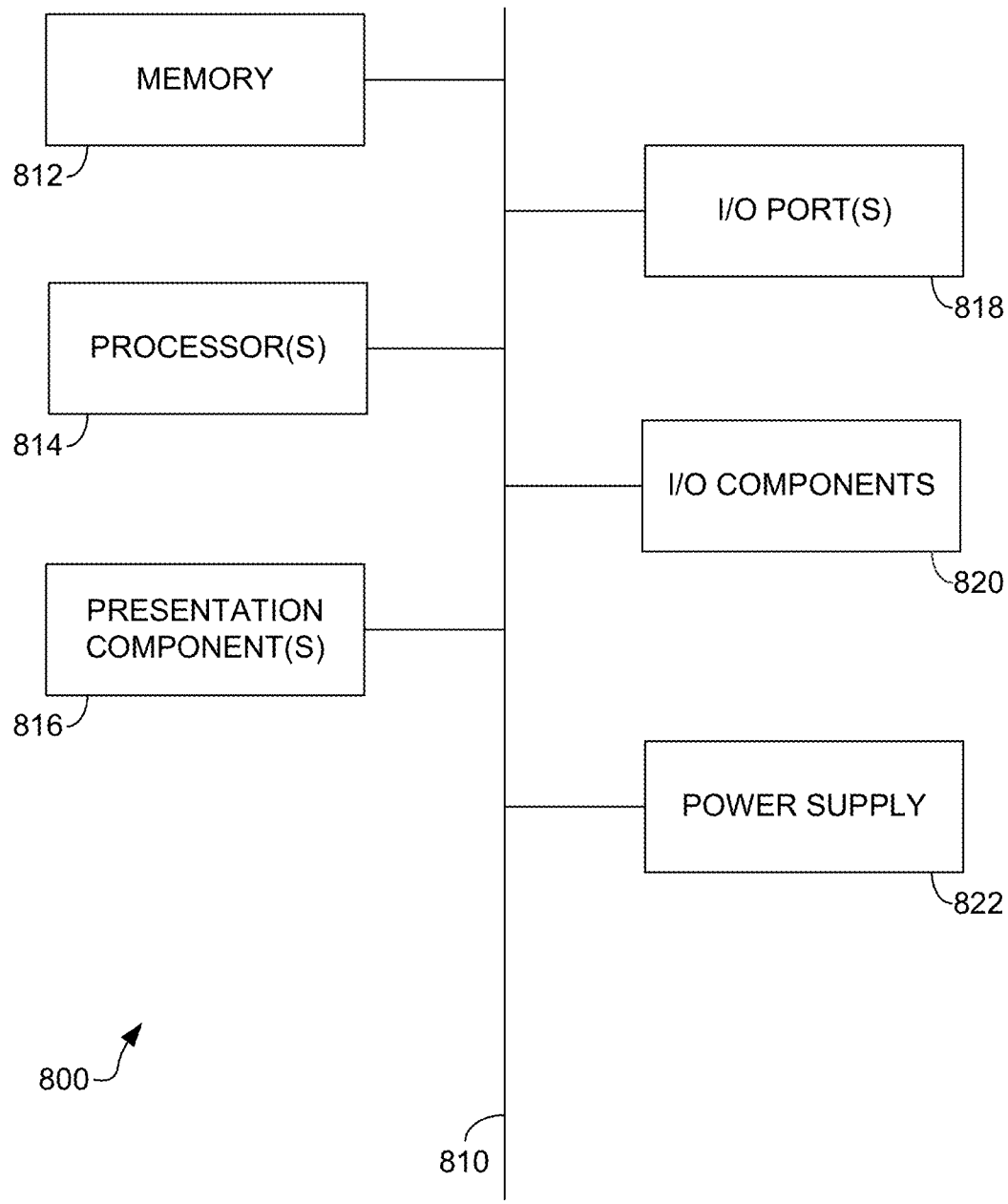
FIG. 8 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   receiving an input depth image having a height value for each pixel;
   determining new height values for pixels of an output depth image by solving an optimization problem that minimizes differences between the new height values of pixels in the output depth image and the height values of corresponding pixels in the input depth image and minimizes a rank of Hessians computed for pixels of the output depth image using the new height values; and
   providing the output depth image.

2. The one or more computer storage media of claim 1, wherein the Hessian for a first pixel in the output depth image is determined using the new height value of the first pixel and the new height value of one or more neighboring pixels.

3. The one or more computer storage media of claim 2, wherein the one or more neighboring pixels comprise pixels in a hexagonal grid surrounding the first pixel.

4. The one or more computer storage media of claim 2, wherein the operations further comprise:
   pre-processing the input depth image to convert the input depth image from a square pixel grid arrangement to a hexagonal pixel grid arrangement.

5. The one or more computer storage media of claim 1, wherein the operations further comprise:
   identifying a boundary in the input depth image; and
   removing boundary pixels along the boundary from consideration when solving the optimization problem.

6. The one or more computer storage media of claim 5, wherein the operations further comprise:
   determining a new height value for each boundary pixel based on the new height values of neighboring pixels for each boundary pixel.

7. The one or more computer storage media of claim 5, wherein the boundary comprises an occlusion boundary in the input depth image, and the boundary pixels comprise pixels participating in the occlusion boundary.

8. The one or more computer storage media of claim 1, wherein the optimization problem minimizes the rank of the Hessians computed for pixels of the output depth image by reducing a nuclear norm of the Hessians.

9. The one or more computer storage media of claim 1, wherein the optimization problem comprises a semi-definite programming problem.

10. The one or more computer storage media of claim 1, wherein the optimization problem is solved using an algorithm generated using alternating direction method of multipliers.

11. A computerized method comprising:
    receiving an input depth image having a height value for each pixel;
    identifying boundary pixels and interior pixels for an object in the input depth image;
    using an optimization problem that balances data fidelity with developability, determining a new height value for each pixel of an output depth image corresponding to each interior pixel of the input depth image, the data fidelity based on differences between the new height values of pixels in the output depth image and the height values of corresponding pixels in the input depth image, the developability based on minimizing a rank of Hessians computed for pixels of the output depth image using the new height values;
    determining a new height value for each pixel of the output depth image corresponding to each boundary pixel of the input depth image based on the new height values of pixels in the output depth image corresponding to interior pixels of the input depth image; and
    providing the output depth image.

12. The computerized method of claim 11, wherein a parameter in the optimization problem controls an extent of the data fidelity and an extent of the developability.

13. The computerized method of claim 11, wherein the Hessian for a first pixel in the output depth image is determined using the new height value of the first pixel and the new height value of one or more neighboring pixels, wherein the one or more neighboring pixels comprise pixels in a hexagonal grid surrounding the first pixel.

14. The computerized method of claim 11, wherein a first boundary pixel comprises a pixel participating in an occlusion boundary.

15. The computerized method of claim 11, wherein the optimization problem minimizes the rank of the Hessians computed for pixels of the output depth image by reducing a nuclear norm of the Hessians.

16. The computerized method of claim 11, wherein the optimization problem comprises a semi-definite programming problem and is solved using an algorithm generated using alternating direction method of multipliers.

17. A computer system comprising:
    a processor; and
    a computer storage medium storing computer-useable instructions that, when used by the processor, causes the computer system to:
    convert an input depth image with a square pixel grid arrangement to a hexagonal pixel grid arrangement with each pixel having a height value;

determine a new height value for pixels in an output depth image using an optimization problem that minimize differences between the new height values of pixels in the output depth image and the height values of corresponding pixels in the input depth image and minimizes a rank of Hessians computed for pixels of the output depth image using the new height values of neighboring pixels in the hexagonal pixel arrangement; and provide the output depth image.

18. The computer system of claim 17, wherein the instructions further cause the computer system to:

identify a boundary in the input depth image;

remove boundary pixels along the boundary from consideration when solving the optimization problem; and determine a new height value for each boundary pixel based on the new height values of neighboring pixels for each boundary pixel.

19. The computer system of claim 17, wherein the optimization problem minimizes the rank of the Hessians computed for pixels of the output depth image by reducing a nuclear norm of the Hessians.

20. The computer system of claim 17, wherein the optimization problem comprises a semi-definite programming problem and is solved using an algorithm generated using alternating direction method of multipliers.

\* \* \* \* \*